United States Patent [19]
Jacques et al.

[11] 4,135,217
[45] Jan. 16, 1979

[54] UTILIZATION OF STORED RUN-OUT INFORMATION IN A TRACK FOLLOWING SERVO SYSTEM

[75] Inventors: James O. Jacques, Tracy; Martin O. Halfhill, San Jose, both of Calif.

[73] Assignee: Xerox Corporation, Stamford, Conn.

[21] Appl. No.: 737,973

[22] Filed: Nov. 2, 1976

[51] Int. Cl.² .................... G11B 21/10; G11B 5/54
[52] U.S. Cl. ............................... 360/77; 360/78; 360/109; 318/617; 318/653
[58] Field of Search .................... 360/77–78, 360/75, 98, 109, 135; 318/615–616, 653

[56] References Cited
U.S. PATENT DOCUMENTS

| | | | |
|---|---|---|---|
| 3,126,535 | 3/1964 | Streeter | 360/77 |
| 3,699,555 | 10/1972 | Duvall | 360/77 |
| 3,838,457 | 9/1974 | Palmer | 360/78 |
| 3,881,184 | 4/1975 | Koepcke et al. | 360/78 |
| 3,924,268 | 12/1975 | McIntosh et al. | 360/77 |
| 3,994,016 | 11/1976 | Moghadam | 360/78 |
| 4,032,984 | 6/1977 | Kaser | 360/77 |

Primary Examiner—Alfred H. Eddleman
Attorney, Agent, or Firm—Barry Paul Smith

[57] ABSTRACT

A servo system including a recording head to sense servo data on a disk track for fine positioning of the head and an external transducer for generating signals representing the coarse position of the head. A micro-processor stores the coarse position signals which include information as to repeatable error such as wobble of the disk. A compensator maintains information concerning small offsets of the disk due to, for example, temperature variations. During coarse positioning of the head, from one track to a desired track, the stored repeatable error information and stored offset information is used to generate error signals to control movement of a carriage connected to the head, whereby the head follows the repeatable error and offset to arrive coarsely on the desired track. After coarse positioning is complete, fine positioning information from the recording head, which information includes the offset information, and the stored repeatable error information are used to generate error signals to control movement of the carriage for fine positioning purposes.

19 Claims, 10 Drawing Figures

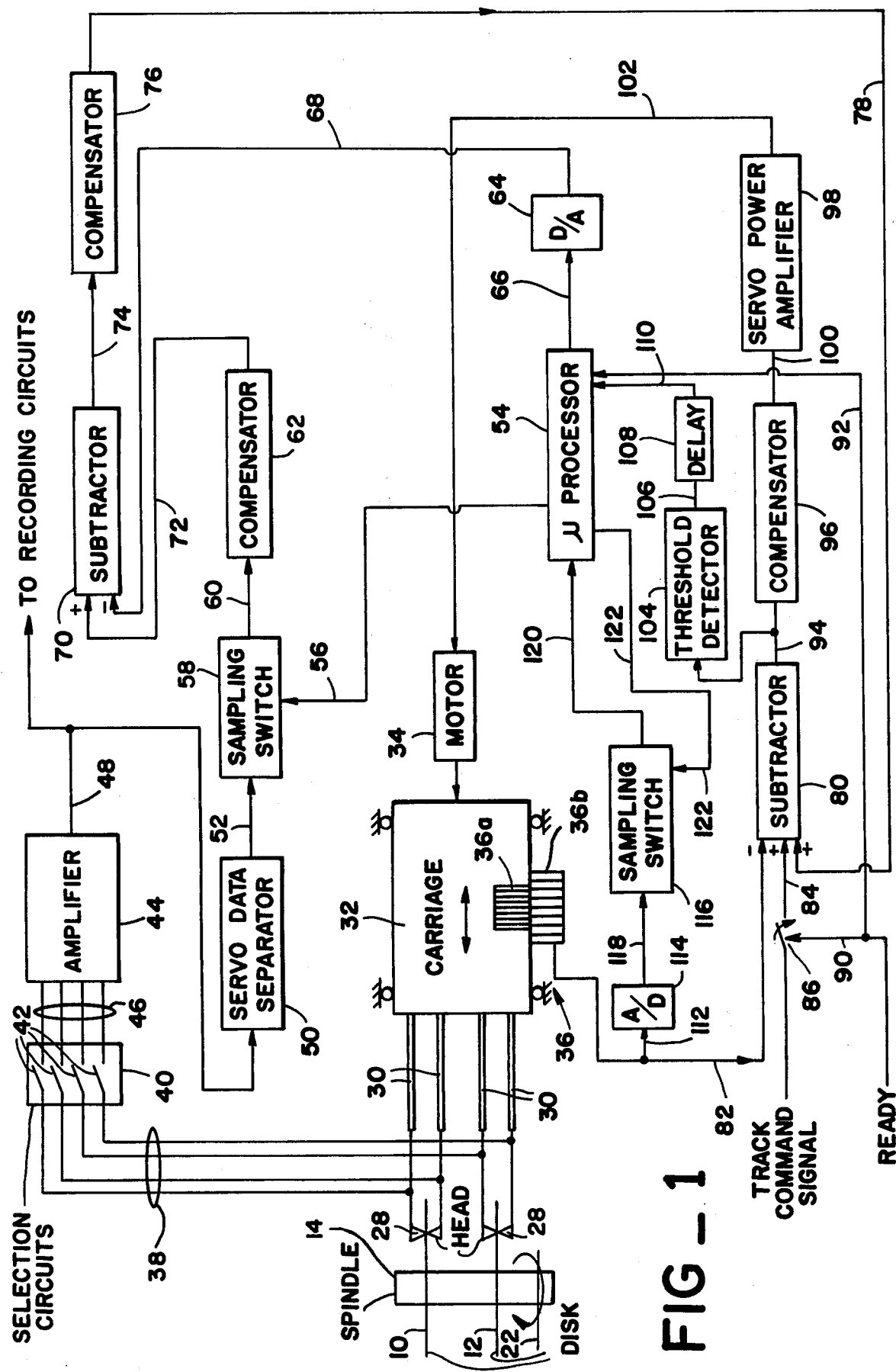

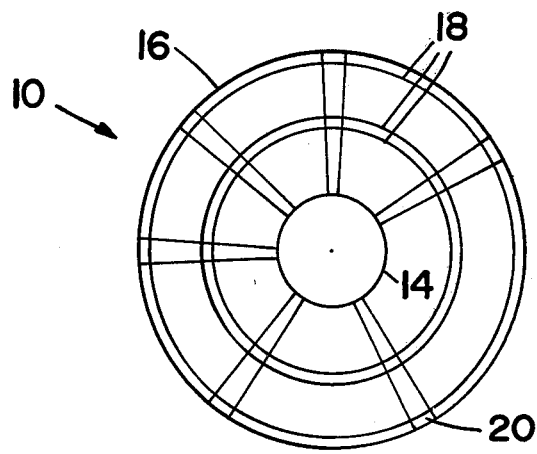
FIG _ 1A
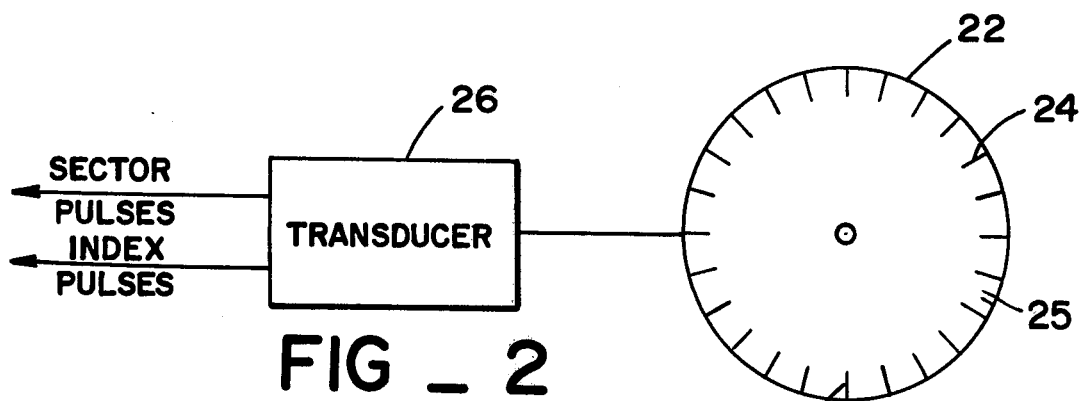
FIG _ 2
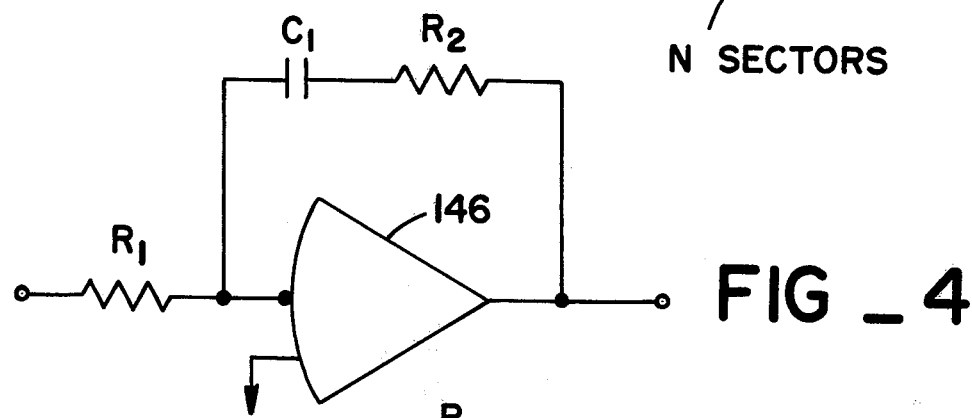
FIG _ 4
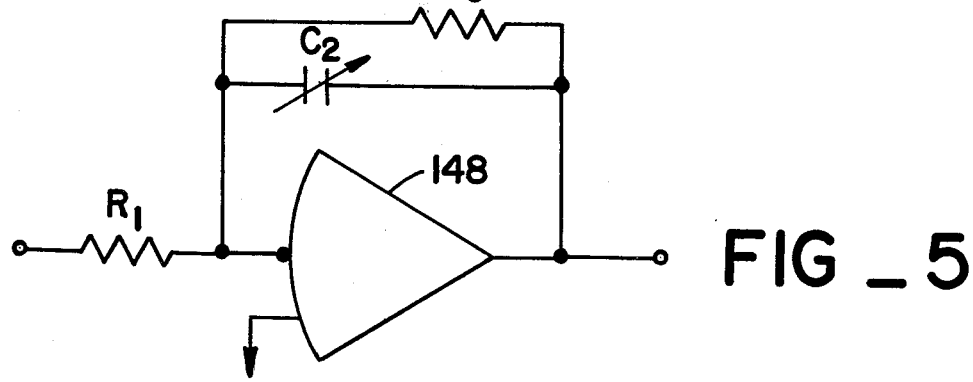
FIG _ 5

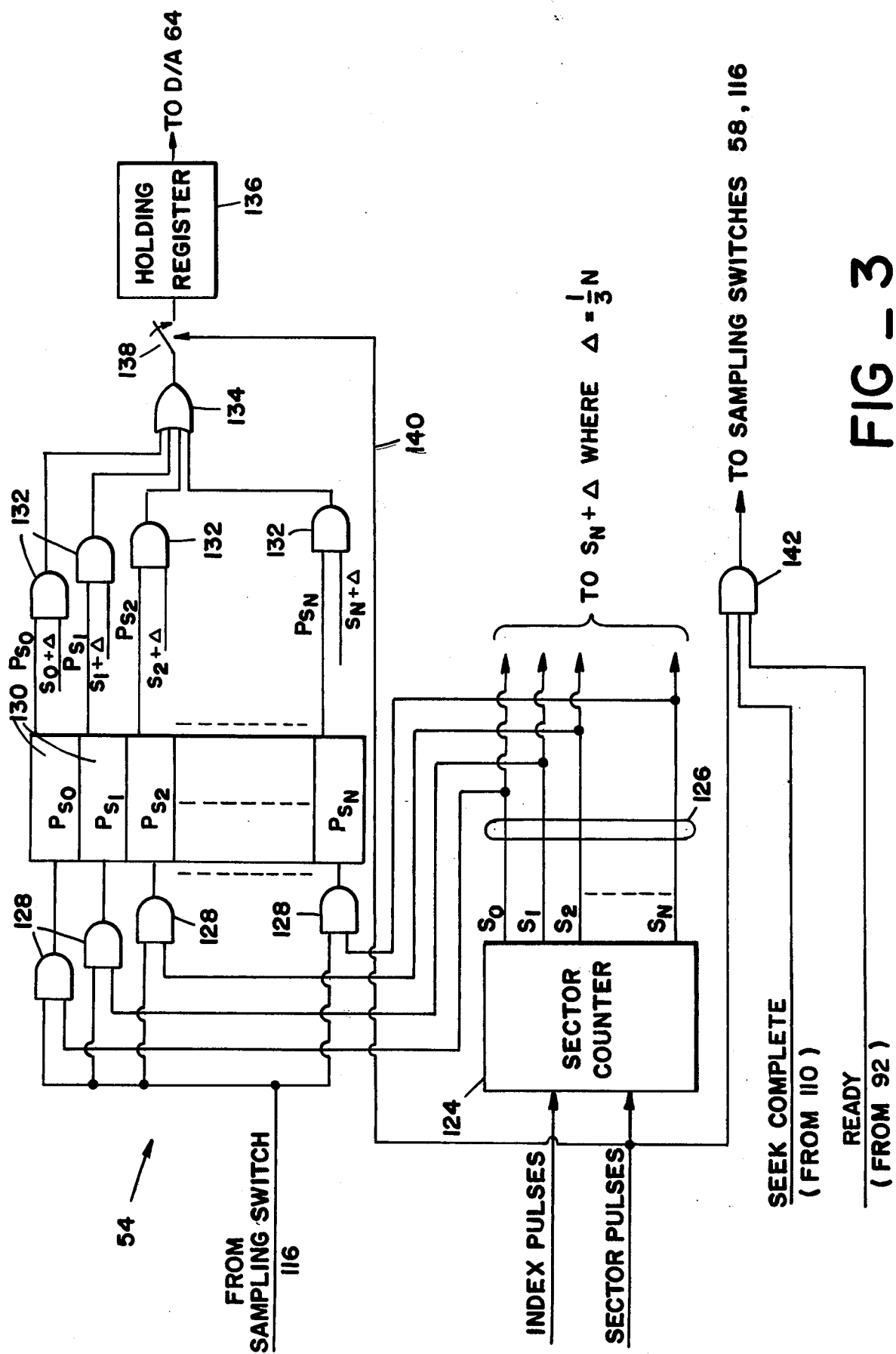

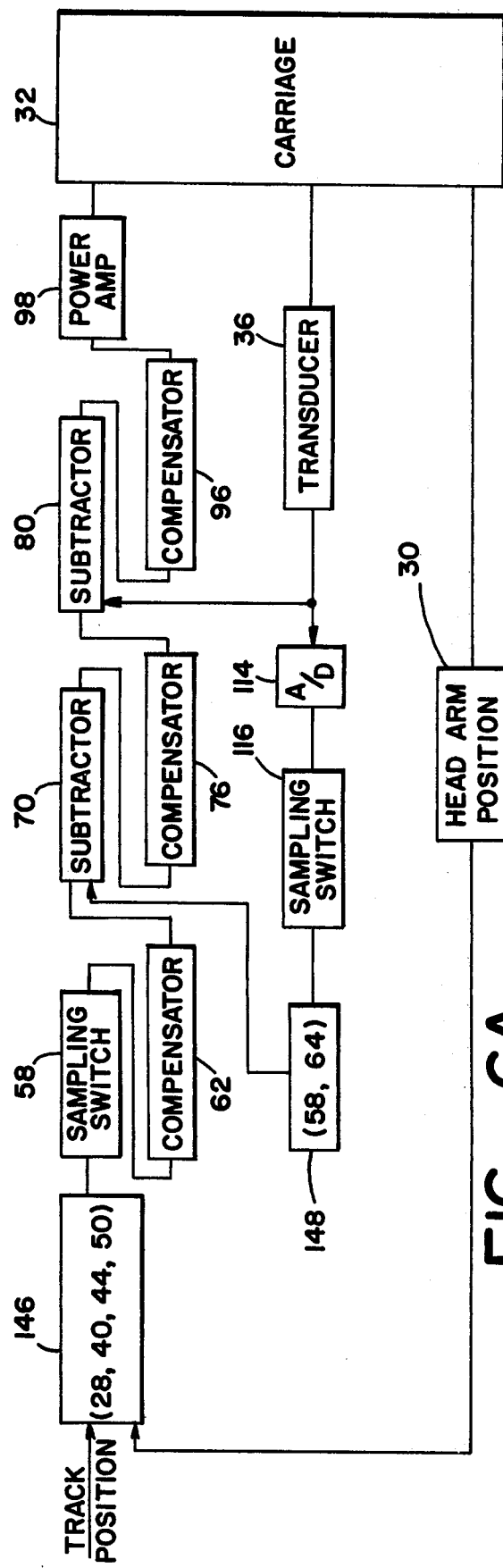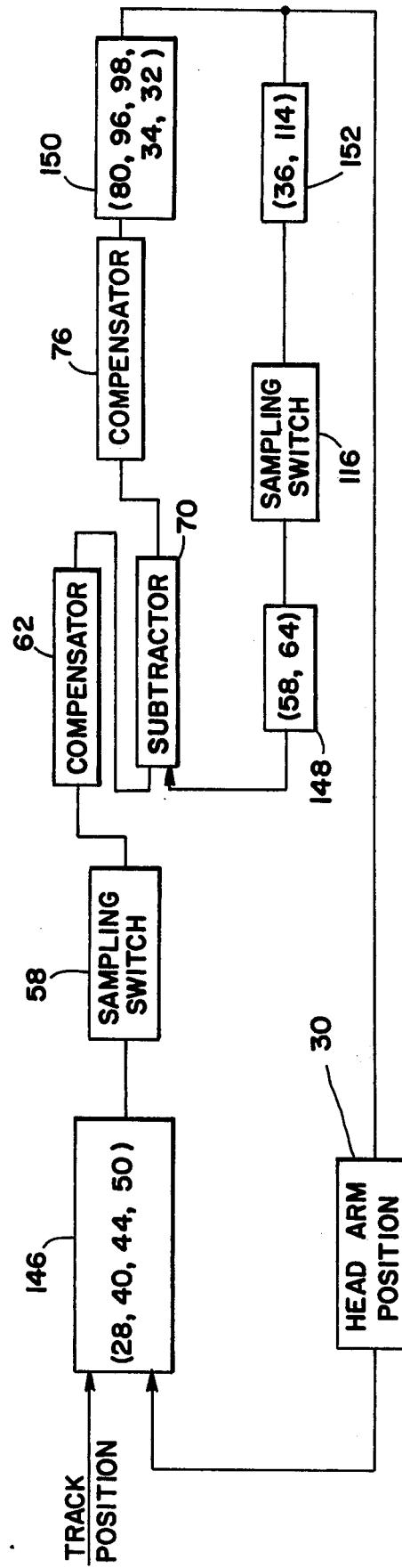
FIG_6A
FIG_6B

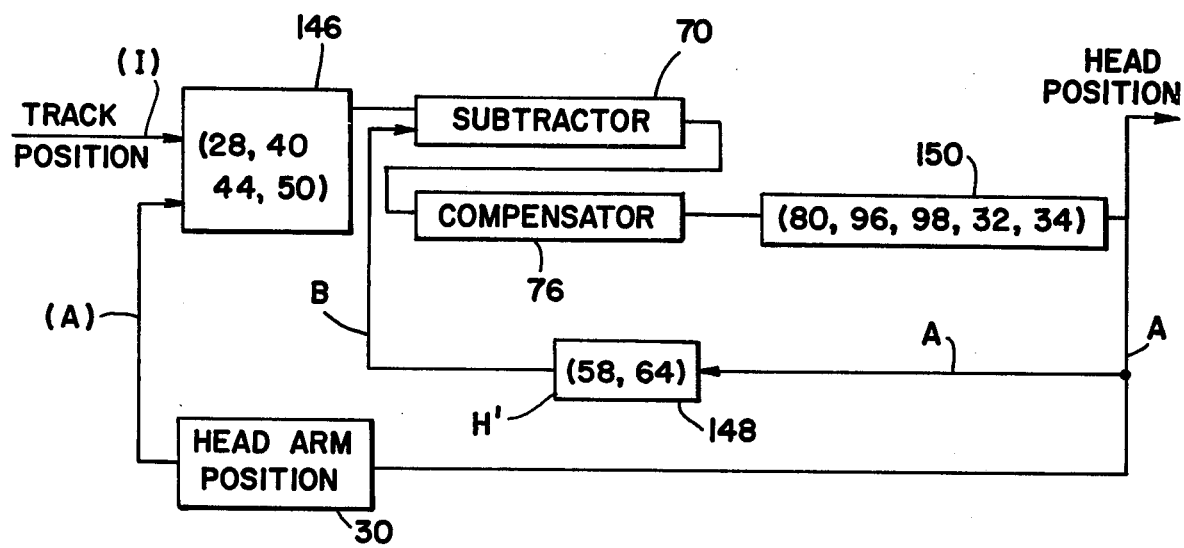
FIG_6C
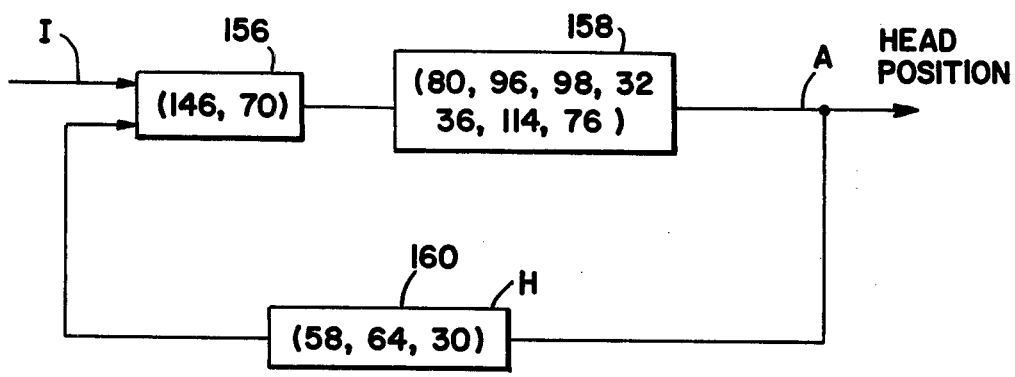
FIG_6D

UTILIZATION OF STORED RUN-OUT INFORMATION IN A TRACK FOLLOWING SERVO SYSTEM

BACKGROUND OF THE INVENTION

This invention relates to a system for positioning one member with respect to another member and, more particularly, to a servo system for aligning a recording head over a desired one of a plurality of tracks on a disk for storing data.

In the data processing field, use is made of rotatable disks having magnetizable surfaces which are magnetized along concentric tracks in accordance with data signals representing the information which is to be stored. The data signals are applied to transducers or heads which move radially on command to specified select tracks to magnetize the disk surface; alternatively, the heads sense the recorded data to reproduce the information. The heads typically are coupled to a carriage which is displaced by an actuator of a servo system to position the head over a desired commanded track.

Recently, disks having high track densities have been developed to increase data storage capacity. For example, track densities have been increased from about 100 tracks per inch to about 200-400 tracks per inch; this increase, therefore, imposes a heavy burden on the servo system to position accurately the transducers over the desired track. In these high density disk systems, if the servo system is inaccurate by a small degree, it may undesirably place the head off center of the commanded track, though this small inaccuracy might be tolerable in a lower track density system.

In a typical servo system, an error signal is generated representing the difference between the track position and the position of the head. This error signal then controls a servo motor which moves the carriage to position the head on center over the track. This process continues until no error signal is generated, thereby indicating that the head is on center.

The primary problem with such servo systems is that inherently there is a lag or phase delay between the time a track position signal is received by the servo system and the time the carriage is moved to position the head on the commanded path. This problem exists because such servo systems, particularly those used in disk drives, have a relatively narrow bandpass of about 150 Hz. or lower. That is, the amplitude of the output signal (e.g., carriage movement) is equal to the amplitude of the input signal (e.g., track position) only up to about the system bandwidth. This is important in disk drive systems because usually the disks are rotated at about 2400 RPM, i.e., 40 Hz., which is the frequency of the track position information. As is known, and as can be shown by a graph illustrating the difference in phase between the output and input of a system having a bandpass of about 150 Hz., the carriage movement will lag the track position input by about 22° at the track position frequency of 40 Hz. From such graph, it also can be shown that such phase lag of 22° results in about a 37% error between the track position and the position of the head after it is moved by the carriage.

The above-mentioned 37% error is significant if one considers the effect that runouts such as wobble have on the ability of a servo system to center the head over a track. Wobble, which is the radial movement of an area on a disk with respect to the disk axis during rotation of the disk, may cause the track centerline to be offset from the head by, for example, 500 micro-inches (the track position). This is known as a repeatable error which occurs at the disk rotation frequency of 40 Hz. and is repeatable in that for each revolution of the disk, such area will follow substantially the same wobble path. This means that with the 37% error due to the bandpass of 150 Hz., the head position will be offset by 500 × 37% = 185 micro-inches, which is not satisfactory for the higher track densities.

The prior art has recognized two approaches to reducing such errors, one being to reduce the wobble and the other to increase the bandwidth of the system. Wobble is caused by a number of factors including, for example, 1) the free play or fit of the shaft, rotating the disk, on bearings, 2) the stiffness of the bearings, and 3) the mounting of the disks on the shaft, which can cause eccentric shaft rotation. Wobble can be reduced, but this requires more expensive bearings to increase their stiffness, and more expensive mountings to reduce free play and provide a truer circular shaft rotation. For example, there has been used conically shaped shafts and mating hubs to provide a tighter, more accurate fit.

If the bandpass of the servo system is increased, then the above-mentioned error for a disk rotating at 40 Hz, can be reduced. However, as with the solution to reducing wobble, this requires more expensive components. The system bandpass can be increased but only at the expense of using more massive parts, such as heavier carriages and carriage arms supporting the heads. Moreover, the more massive carriage and arms supporting the heads would require greater power consumption by the servo system electrical components to move them.

SUMMARY OF THE INVENTION

It is an object of the present invention to provide a novel apparatus for positioning one member with respect to another member.

It is another object of the present invention to provide a servo system which overcomes the above-mentioned disadvantages of prior solutions for improving the accuracy of positioning a recording head in relation to a disk having high density tracks of data.

Another object of the present invention is to employ relatively lightweight components in an electromechanical track following servo system to reduce costs and power consumption.

A still further object of the present invention is to use relatively inexpensive electrical and mechanical components to reduce overall system costs.

These and other objects of the present invention are obtained with a servo system having a relatively narrow bandpass. A first transducer on the carriage provides information as to the "coarse" position of the carriage and hence the head in relation to a desired track, while the head functions as a transducer for providing "fine" information of the head with respect to the track. A storage device stores data representing the coarse carriage position, this data including the repeatable error or wobble for a predetermined number of areas or sectors of the disk. During coarse positioning, carriage position information from the coarse transducer is fed back in the servo system to one subtractor which also receives a signal representing the commanded or desired track, and a signal representing the wobble and other small offsets or movements of the track due to, for example, temperature variations of the disk. The subtractor generates thereby an error signal which controls a servo motor to position the head over the track. After this coarse positioning is completed, both the coarse position transducer information and the fine position information are fed back to the one subtractor, which also receives the command signal, to generate the error signal which controls the servo motor, thereby more accurately positioning the head in relation to track center.

To generate the fine information, the coarse position information in the storage device is subtracted, in another subtractor, from a signal representing both the position of the head in relation to track center and the small offset to produce an error signal which is then phase compensated and fed back to the one subtractor as the fine position information, the phase compensation being such that the difference in phase between the coarse position information and the error signal produced by the other subtractor is greater than if there was no phase compensation.

BRIEF DESCRIPTION OF THE DRAWINGS

FIG. 1 is a block diagram of the servo system of the present invention.

FIG. 1A is an illustration of a surface of a disk shown in FIG. 1.

FIG. 2 is a diagram showing apparatus for generating timing signals.

FIG. 3 illustrates schematically the micro-processor of FIG. 1.

FIGS. 4 and 5 illustrate, respectively, phase compensators of FIG. 1.

FIGS. 6A-6D are block reduction diagrams of FIG. 1, which will be used to explain, mathematically, the operation of the present invention.

FIG. 1 discloses two disks 10 and 12 connected to a common spindle 14 which is rotatable in the direction of the arrow by a motor (not shown) at, for example, 40 Hz., which is typical for disk drives. Each disk 10,12 has a surface 16, shown in FIG. 1A, with a plurality of concentric tracks 18 spaced about the surface from the inner to outer circumference thereof. The surface 16 also includes N sectors 20 equally spaced about the surface and each extending in a radial direction from the inner circumference to the outer circumference. Each track 18, between the sectors 20, has, or can have, recording data stored in the form of magnetized regions representing bits of information. A track following or servo data code, also in the form of magnetized regions, is stored on each track in the plurality of sectors 20. This code may comprise any of a number of known codes used for track-following purposes, but preferably is of a type disclosed in U.S. Pat. application Ser. No. 732,634, now U.S. Pat. No. 4,101,942, entitled "A Track Following Servo System And Track Following Code," by J. Jacques, a co-inventor of the present invention, filed prior to the date of this application and assigned to the assignee of this application.

A timing ring or disk 22 is connected to the spindle 14 and rotatable with each disk 10,12. As shown in FIG. 2, this ring 22 includes N single indicies 24, each of which is in line with the beginning of one of the N sectors 20 in the direction of rotation of the spindle 14. Another index 25 comprises two closely spaced indicies, as shown, to indicate that the next index 24 to be detected corresponds to the first of the N sectors 20 spaced about the surface 16. A transducer 26 is coupled to the timing ring 22 and detects the indicies 24 and 25 as they pass thereby. The transducer 26 generates a sector pulse each time an index 24 is detected, and generates an index pulse when index 25 is sensed. The indicies 24 and 25 may be magnetized or optical information detected by a standard magnetic or optical transducer 26.

A plurality of recording heads 28, one for each of the surfaces 16 of disks 10 and 12, are connected to respective arms 30 which are connected to a common movable carriage 32. A motor 34 actuates the carriage in response to control signals to move the heads 28 radially along the disk surfaces 16.

A "coarse" position transducer 36 is used to determine the coarse position of the heads 28 with respect to a desired track 18. Transducer 36 includes a movable member 36a fixedly connected to the carriage 32 and a fixed member 36b. An output signal is produced by the transducer 36 in dependence on the position of moving part 36a in relation to the fixed part 36b, this output signal representing the position of the carriage 32.

The output signal of each head 28 is fed over respective lines 38 to a selection circuit 40 which comprises a like number of switches 42 as lines 38. The purpose of the selection circuit 40 is to enable selection of a particular disk surface 16 for recording or reproducing data by the closure of one of the switches 42. An amplifier 44 receives the selected output signal over one of the lines 46 and feeds the amplified signal over line 48 to the recording circuits (not shown) and a servo data separator 50.

In a manner well known in the art, the recording circuits are capable of detecting recorded data on the tracks between the sectors 20 to reproduce the information. The servo data separator 50 is of a type that operates in conjunction with the particular tracking code recorded on the disk surface 16 within the sectors 20 to produce error signals representing the position of the head in relation to the track centerline. For example, the separator 50 may be a peak amplitude detector system which functions in conjunction with a code, known as the tribit code, having magnetic flux reversals on opposite sides of the centerline of the track. The head 28 detects this code and generates an output signal representing the amplitudes of rate of change of detected flux. If the head is not centered in relation to the centerline of the track, the peak amplitude of the rate of change of detected flux on one side of the track centerline will be different from the peak amplitude of the rate of change of detected flux on the other side of the track centerline. The separator 50 compares these peak amplitudes and produces an output or error signal over line 52 representing the off centered position of the head. Thus, the head 28 is a "fine" position transducer which is used to center accurately the head over the desired track after coarse positioning of the head has been completed, as will be more fully described.

Preferably, however, the servo data separator 50 is of the type disclosed in the above-mentioned co-pending U.S. patent application to Jacques and is incorporated by reference hereto in its entirety. Such application discloses a novel code which is recorded on the opposite sides of the track centerline in the sectors 20 and can be detected by the heads 28. As described in the co-pending application, the track following system or separator 50 generates an error signal over line 52 which represents the difference in the amount of flux sensed on either side of the track centerline, this difference also representing the position of the head in relation to such centerline whereas the known separator described above compares the peak amplitudes of the head output signal. It is to be noted that separator 50 outputs a measured error position between the head 28 and the track, and this output contains information as to low frequency offsets, much lower than 40 Hz., of the head from the track centerline, as will be more fully described, as well as information as to wobble occurring at 40 Hz.

A micro-processor 54 produces gating signals over line 56 to close periodically sampling switch 58. Consequently, when switch 58 is closed, the output signal of separator 50 is fed over line 60 to a compensator 62 which compensates for the low frequency offsets mentioned above, as will be more fully described. Even with switch 58 opened, compensator 62 provides a signal to compensate for such offsets.

Micro-processor 54, which stores, in digital form, carriage 32 position information at the sector times, i.e., the times that sectors 20 are being sensed by heads 28, outputs such information during coarse or fine positioning at the sector times to a digital-to-analog converter 64 over line 66. The D/A converter 64 then feeds this information over line 68 as one input to a subtractor 70, the other input to subtractor 70 being the output over line 72 from the compensator 62. Subtractor 70, therefore, during the time switch 58 is closed, subtracts such carriage 32 position information from the compensated error information from compensator 62 to produce another output or error signal over line 74 which is compensated by a phase compensator 76. It is important to note that even if switch 58 is open, subtractor 70 subtracts the output of processor 54 from the output of compensator 62. It is also important to note, and as will become apparent from the discussion below, that the course position information from transducer 36, and hence the information in micro-processor 54, comprises the repeatable error or wobble information and offset information.

The output signal from compensator 76 is fed back over line 78 as one input to another subtractor 80. The other two inputs to subtractor 80 are the output signal (carriage position information) from coarse position transducer 36 over line 82 and a command signal, representing a desired track to which the heads 28 are to be moved, which is coupled to the subtractor 80 over line 84 through a switch 86. If the carriage 32 is coarse positioning or fine positioning the heads 28, then subtractor 80 subtracts the signal on line 82 from the sum of the signals on lines 78 and 84.

Switch 86 is responsive to a power-up ready signal on line 90. The ready signal is also fed over line 92 to the micro-processor 54 to control the generation of the gating signal on line 56.

The output or error signal from the subtractor 80, which represents the difference between the head position and the desired track, is then fed over line 94 to another standard compensator 96 which, in a well-known manner, provides gain and phase stability to the motor 34 and carriage 32. Also in a well-known manner, a servo power amplifier 98 receives the compensated signal from compensator 96 over line 100 to drive the motor 34 via line 102 in a direction to center the head with respect to the desired track. The output signal from subtractor 80 is also fed to a threshold detector 104 which determines when coarse positioning has been completed. Upon such completion, detector 104 produces an output signal over line 106 which is delayed by a delay 108 to provide time for the heads 28, arms 30 and carriage 32 to settle down, the delayed signal representing a seek complete signal and being sent to the micro-processor 54 over line 110, also to control the gate signal on line 56. When coarse positioning is complete, fine positioning begins.

The coarse position signal from transducer 36 is also fed back over line 112 to an analog-to-digital converter 114 to digitize the signal. The digitized signal is then fed to a sampling switch 116 over line 118 and then, upon closure of the switch, to the micro-processor 54 over line 120. Sampling switch 116 is closed by a gating signal over line 122 produced by the micro-processor 54. This gating signal on line 122 is also controlled by the signals on lines 92 and 110.

The micro-processor 54, as illustrated in more detail in FIG. 3, includes a counter 124 which counts the N sectors 20 ($S_0$–$S_N$) upon receipt of the index and sector pulses from transducer 26. Each time an index pulse is generated, the sector counter 124 is reset to 0. Thereafter, as each sector pulse is generated, counter 124 provides output pulses on respective lines 126 corresponding to sectors $S_0$–$S_N$. The respective pulses $S_0$–$S_N$ on lines 126 are each fed as one input to respective AND gates 128, there being, therefore, N such gates 128. The other input to each AND gate 128 is the signal from sampling switch 116. Thus, as the counter 124 counts successive sectors $S_0$–$S_N$ and produces the corresponding output signals $S_0$–$S_N$, the gates 128 are successively enabled to gate the digital signals representing the coarse position of the transducer 36 at the corresponding sector. Each of the signals gated by gates 128 is then stored in N registers 130 holding the digitized position data $P_{S_0}$–$P_{S_N}$ for the position of the carriage 32 at each respective sector.

The digitized signals in each respective register 130 are fed as one input $P_{S_N}$ to respective AND gates 132. The other input to each of the AND gates 132 is a gating input which is a pulse $S_N$ from counter 124 delayed by an amount $\Delta$. For example, the position signal $P_{S_0}$ is gated into the register 130 at the time of gate signal $S_0$; however, it is gated through AND gate 132 at the time of gate signal $S_0 + \Delta$. The delay $\Delta$ is given by the following equation:

$$360°/120° = N/\Delta$$

or $$\Delta = \tfrac{1}{3} N$$

Thus, if N equals 24, there are this many sectors 20 on disk surface 16 and $\Delta$ equals 8. In other words, the delay $\Delta$ in sector times is such that the signal $P_{S_0}$ is gated through AND gate 132 by output pulse $S_8$ equal $S_0 + 8$. Thus, the output line 126 transmitting the pulse $S_8$ is connected to the AND gate 132 receiving the signal $P_{S_0}$. In a like manner, the other lines 126 are connected to the other gates 132. As will be appreciated, by the above formula there is a phase delay of 120° between the time signal $P_{S_N}$ is stored in a register 130 and then gated through a gate 132.

Each output of each AND gate 132 is fed as one input to an OR gate 134. The output of OR gate 134 is fed into a holding register 136 through a switch 138 which is closed each sector time by each sector pulse on line 140. After a short delay, the holding register 136 outputs the signal to the D/A converter 64.

The micro-processor 54 also includes an AND gate 142 having one input receiving the sector pulses, another input receiving the seek complete signal on line 110 and a third input receiving the ready signal on line 92. The output of AND gate 142 is the gating signal sent over lines 56 and 122 to close the respective sampling switches 58 and 116. Thus, when a seek command is in process during coarse positioning, gate 142 is disabled, thereby opening switches 58 and 116. When the coarse positioning is complete, gate 142 is enabled, closing the sampling switches 58, 116 each sector time (assuming the ready signal is present). Consequently, only during the sector times while fine positioning the head 28 does micro-processor 54 receive position information from transducer 36 and subtractor 70 receive error information generated by separator 50.

FIG. 4 illustrates in more detail the compensator 62 including an operational amplifier 146 with resistor $R_1$ at its one input, and a resistor $R_2$ and integrating capacitor $C_1$ in series. Compensator 62 functions to compensate continuously for low frequency drifts of the disks 10, 12 that result in an offset between the position of a selected head in relation to the centerline of the desired track. That is, one type of low frequency drift is due to small temperature variations which cause the disk to expand or contract a slight amount, thereby moving the track centerline and thus offsetting the head from such centerline. This low frequency offset is integrated by capacitor $C_1$, so that compensator 62 will produce a signal component which, as will be appreciated from FIG. 1, cause motor 34 to move slightly carriage 32, to realign the selected head over the track centerline. Capacitor $C_1$ retains its integrated offset error signal during the seek operation for use by subtractor 80 when coarse positioning the head. Compensator 62 is designed such that high frequency changes, such as wobble occurring at the disk rotation rate of 40 Hz. are passed therethrough with a gain of 1 and no phase shift.

FIG. 5 illustrates in more detail the phase compensator 76 including an operational amplifier 148 with resistor $R_1$ at its one input and a parallel connection of variable capacitor $C_2$ and resistor $R_3$. The capacitor $C_2$ is adjusted so that the total phase lag of a signal through compensator 76, and the closed loop servo comprising subtractor 80, compensator 96, amplifier 98, motor 34 and carriage 32 and transducer 36 is 60° at 40 Hz. The latter six elements may be considered to comprise a standard servo system head positioner of 150 Hz. bandwidth and having a phase lag of 22°, as mentioned previously; therefore $C_2$ will be adjusted so that compensator 76 produces a phase lag of 38° between its input and output.

In operation, when the system is fully powered, a ready signal is generated in a known manner and closes switch 84. If, for example, at this time the heads 28 are over track #400, but it is desired to reproduce recording data on track 20, it will be necessary first to position coarsely the heads 28 in relation to the desired track #20. Therefore, a track command signal corresponding to track #20 is then fed as one input to the subtractor 80, this command signal also being generated in a well known manner. The other input to the subtractor 80 is the carriage position signal generated by transducer 36 and the output from compensator 76. At the present time, since the heads are located over track #400, the transducer 36 will generate a carriage position signal representing such track.

Note that during the coarse seeking operation, microprocessor 54 continues to output information to subtractor 70, thereby providing wobble or runout information, through subtractor 74 and compensator 76, which information is superimposed at subtractor 80 on the coarse seeking motion from tranducer 36. Furthermore, the integrated offset error on line 72, stored in capacitor $C_1$ during the sector times and available during coarse positioning at all times, continues to provide offset information to subtractor 80 through subtractor 70 and compensator 76, so that when coarse seeking is complete, the head is in proper position relative to the desired track to commence fine positioning. That is, subtractor 80 receives such wobble and offset information during coarse positioning as a result of subtractor 70 subtracting the signals from processor 54 from the signals from compensator 62.

The subtractor 80 then generates an error signal representing the difference between the position of the carriage and the desired track #20. This error signal is then compensated by compensator 96 and amplified by servo power amplifier 98 to drive motor 34 in a direction in accordance with the sign (+ or −) of the error signal. The motor 34 thereby moves the carriage 32 and hence heads 28 from track #400 towards track #20.

The error signal from subtractor 80 is also fed to the threshold detector 104 which has a high and a low threshold corresponding, respectively, to the outer and inner sides of any track. If the amplitude of the error signal is between these thresholds, it is an indication that the heads 28 have been adequately coarse positioned. At the present time, with head 28 over track #400, the error signal will be outside these threshold values; therefore, coarse seeking of track #20 has not been completed. Furthermore, since the seek complete signal has not yet been produced, AND gate 142 (FIG. 3) is disabled keeping open sampling switches 58 and 116.

The above process continues until the heads 28 are coarsely positioned over track #20 so that the error signal produced by subtractor 80 is within the two threshold limits of detector 104. At this time, detector 104 generates an output signal which is delayed by delay 108 to allow the carriage 32 to settle within the threshold limits. Consequently, it is now time to fine position the heads 28 in relation to the centerline of the track #20. Therefore, a seek complete signal, which is the output of delay 108, enables gate 142 to close the sampling switches 58, 116 each time the heads 28 traverse a sector 20.

At this time of fine positioning, with one of the switches 42 of selection circuit 40 closed, the servo data separator 50 produces an error signal which represents the difference between the head position and the track #20 position, i.e., the position of the selected head 28 in relation to the track centerline. Each sector 20 for each track 18 may comprise a number of tracking codes so that during a sector time, a number of error signals are generated by the separator 50. The sampling switch 58, which is closed for the duration of each sector time, feeds therethrough these error signals which are then compensated by compensator 62 and fed as one input to subtractor 70.

Since sampling switch 116 also is closed for the duration of the sector time that switch 58 is closed, the position of the transducer 36 at a particular sector time $S_N$ is updated and stored in one of the registers 130 in accordance with one of the counter pulses $S_N$. However, the output signal of the micro-processor 54 at this sector time $S_N$ is a digital signal representing the position of the transducer 36 when the selected disk surface has rotated 120°. This output signal is converted by D/A converter 64 and fed as the other input to subtractor 70. Consequently, subtractor 70 subtracts from the error signal generated during, for example, a sector #2, a signal representing the position of the transducer 36 at the time sector #10 is detected (assuming $\Delta = 8$ as previously described). It should be noted at this time, and will be described more fully below, that prior to the initial seek, registers 130 will have been initialized with the repeatable wobble or runout data for a particular disk drive, this data being updated during use of the drive by storing new data in the registers during the sector times, in the manner indicated above. However, it also should be noted that since the wobble should stay substantially the same after initialization and during use of the system, the data into the micro-processor 54 will be substantially the same as that already stored from previous disk revolutions.

The error signal from subtractor 70 is then phase compensated by compensator 76 and fed back to the subtractor 80. Thus, during fine positioning of the selected head 28, subtractor 80 subtracts the transducer 36 position signal from the signal from compensator 76 and from the track command signal on line 84. This output signal of subtractor 80 is then fed back through compensator 96 and servo power amplifier 98 to drive motor 34 to position finely the head 28.

A given disk drive will have a particular runout, i.e., wobble or repeatable error. This information should be stored in registers 130 prior to use of the disk drive for recording or reproducing purposes so that the heads 28 can be positioned accurately in accordance with the present invention. It has been determined that it takes about eight revolutions of the disks before the wobble and initial offset error has settled to a particular value for each sector. Consequently, for initializing purposes, after each power-up sequence of the machine, and in a well-known manner, the head 28 is positioned to a predetermined track location, for example track number 0 so that the repeatable error can be sampled. Then, the disks are rotated about eight revolutions and during these revolutions the runout data is fed into the registers 130 in the manner already described. After each revolution, the registers 130 store updated runout information, and after about the eighth revolution it is assumed the stored runout data represents the runout which the disk drive will have upon first data recording or reproducing use.

FIG. 6A shows the first step in reducing the block diagram of FIG. 1 to explain mathematically the present invention. Those elements which may be combined in a single block for this explanation are shown in the drawing. The head 28, selection circuit 40, amplifier 44 and servo data separator 50 may be considered a subtractor 146 producing an output signal representing the difference between the position of the desired track and the position of the arms 30 and hence heads 28. Thus, one input to subtractor 146 is the track position represented by the prerecorded servo code in sectors 20 and the other input is the head arm position. The other elements in FIG. 6A are as shown in FIG. 1, except that the micro-processor 54 and D/A converter 64 also have been combined in one block 148 as they do not produce a phase delay relative to each other.

FIG. 6A may be reduced as shown in FIG. 6B. This diagram is similar to FIG. 6A except that subtractor 80, compensator 96, power amplifier 98, motor 34 and carriage 32 are combined in one block 150 since these elements comprise the components of a standard or basic servo positioner. Transducer 36 and A/D converter 114 are combined in block 152 as they have a gain of 1 at 40 Hz.

Now, if we evaluate the system of FIG. 6B at the runout or disk rotation frequency of 40 Hz., compensator 62 can be set to have a gain of 1 at 40 Hz. and higher. Also, since sampling at sector times is at a high rate relative to the runout frequency, i.e., in the example case 24 times higher since there are 24 sectors on the disk, phase shifts of the sampler indicated by switches 58 and 116 can be ignored. Furthermore, if block 152 has negligible phase shift, as it does, it can be eliminated as a phase shift element, and therefore, the diagram of FIG. 6B reduces further to the diagram of FIG. 6C. Block 150 may be considered to be the servo system response G (22° in the example already given) and its output represents the head position and carriage position.

If the various inputs in FIG. 6C are now referenced as I, A, B, and block 148 as H', as shown in FIG. 6C, the output of subtractor 146 is $I - A$. The input and output of block 30 is A, the head position, since the head arm position has a gain of 1. The output of subtractor 70 is then $I - A - B = I - (A + B)$. Since $B = AH'$, the output of subtractor $70 = I - (A + AH') = I - A(1 + H')$. Now, if we let $H = (1 + H')$, combine the two subtractors 146, 70 into a block 156, and consider block 76 as a phase modifier $C_2$ of the system response G (block 150), FIG. 6C reduces further to FIG. 6D, with blocks 76 and 150 combined as 158 and blocks 148 and 30 combined as block 160 or H.

In order for the head position, represented by A, to follow exactly the track position, represented by I, at the specified runout frequency, the head signal A must be delayed from the track position by an amount H and subtracted from the track position I. If the track position error signal from block 156 is $1\underline{+60°}$, then if the block 158 ($C_2$ G) has a transfer function of 1 at 40 Hz. with a phase lag of 60°, i.e., $1\underline{-60°}$, the head position will be equal to the track position I. But, it this is true, then H must delay A by 60°, i.e., $H = 1\underline{-60°}$ since the subtraction in subtractor 156 is $I - I\underline{-60°} = 1\underline{+60°}$, the error signal. As a result, it is seen that phase lag must be added to the servo system response G. Or, in the typical case where $G = 1\underline{-22°}$ at the runout frequency of 40 Hz., compensator 76 must be $1\underline{-38°}$.

It is also clear that if $H = H' + 1$, where H' is the phase delay of the transducer 36 signal from processor 54, then:

$$H = H' + 1 = 1\underline{-°60}$$
$$H' = -1 + 1\underline{-60°}$$
$$H' = 1\underline{-120°}$$

With reference back to the micro-processor storage locations, the 120° of delay at a gain of 1 is achieved merely by outputting the value stored at each sector time at a sector time which occurs 120° or ⅓ of disk rotation later.

While the invention has been particularly described in relation to a system having a bandwidth of 150 Hz. and in which the repeatable error occurs at 40 Hz., the invention is not limited to such system but is applicable to any system of rotary motion where a runout having a particular frequency is known and is of a major effect. Thus, for a system having a given bandwidth, the present invention will produce the results indicated above, provided that the system phase lagging elements are evaluated and adjusted to the particular runout frequency.

While the invention has been particularly shown and described with reference to a preferred embodiment thereof, it will be understood by those skilled in the art that the foregoing and other changes in form and details may be made therein without departing from the spirit and scope of the invention.

What is claimed is:

1. A servo system for moving a recording head in relation to one of a plurality of data tracks on a rotatable disk having a repeatable error at a determined frequency and being subject to an offset at a frequency lower than said determined frequency, comprising:
   (a) first generating means for generating first signals representing said offset;
   (b) second generating means for generating second signals representing said repeatable error; and
   (c) movable means, connected to said head, for coarse positioning said head in relation to said one track, said movable means including means, responsive to said first signals and said second signals, for moving said head to said one track so that during coarse positioning said head follows said error and said offset, and third generating means for generating third signals representing the positions of said positioning means;
   (d) said second generating means comprises means for feeding back said third signals from said third generating means to said second generating means, and means for delaying said feedback third signals a predetermined amount to produce said second signals; and
   (e) said means for moving comprises means for producing error signals corresponding to the difference between said first signals and said second signals, and means for phase compensating said error signals by a predetermined amount, said third signals being delayed and said error signals being phase compensated in dependence on said repeatable error frequency.

2. A servo system according to claim 1 further comprising:
   (a) fourth generating means for generating fourth signals representing the fine position of said head in relation to said one track; and
   (b) means for transmitting said fourth signals to said first generating means when coarse positioning is complete, said first signals being modified to include the information of said fourth signals, said means for producing being responsive to said modified first signals and said second signals to position finely said head in relation to the centerline of said one track.

3. A servo system according to claim 2 wherein the total of the delay of said third signals and the phase shift of said error signals is 180°.

4. A servo system for accessing recording data on a rotatable disk having a plurality of concentric tracks, the disk including spaced apart sectors $S_N$ having track following servo data, the tracks having a repeatable error at a determined frequency and being subject to an offset at a frequency lower than said determined frequency, comprising:
   (a) first means, including a recording head which senses said servo data, for generating first signals representing the fine position of said head in relation to the centerline of a desired track, whereby said first signals include information as to said offset;
   (b) second means, external of said head, for generating second signals representing the coarse positions of said head in relation to said desired track, said second signals including information as to said repeatable error;
   (c) first means for storing samples of said second signals corresponding to the positions of said head at sectors $S_N$;
   (d) second means, responsive to said first signals, for storing third signals representing said offset;
   (e) means for sampling said second signals and transmitting said samples to said first storing means and for transmitting said first signals to said second means for storing during fine positioning of said head;
   (f) moving means, connected to said head, for moving said head in relation to said desired track, said moving means including means responsive to said stored samples and said third signals during coarse positioning of said head for positioning said head coarsely on said desired track, and means responsive to said first signals and said stored samples when coarse positioning has been completed for positioning said head finely in relation to said track centerline, said second generating means being coupled to said moving means for generating said second signals; and
   (g) said moving means including a first subtractor for subtracting said stored samples from said third signals during coarse positioning to produce first error signals and subtracting said stored samples from said first signals during fine positioning to produce second error signals, means for phase compensating said first error signals or said second error signals, and a second subtractor for subtracting said second signals from said second generating means from signals representing said desired track and from said phase compensated first error signals or said phase compensated second error signals to produce third error signals, said phase compensating means phase compensating said first error signals in dependence on any phase difference between said first signals from said second generating means and said phase compensated error signals subtracted by said second subtractor.

5. A servo system according to claim 4 wherein said first means for storing includes means for sending stored samples corresponding to sectors $S_N + \Delta$ to said first subtractor when said head is sensing said servo data in sectors $S_N$, where sectors $S_N + \Delta$ are spaced a predetermined number of degrees from sectors $S_N$.

6. A servo system according to claim 5 wherein said transmitting means comprises:
   (a) means for generating sector pulses indicating the commencement of said sectors $S_N$;
   (b) means, responsive to said third error signals, for generating seek complete signals representing that coarse positioning has been completed; and
   (c) means, responsive to said sector pulses and said seek complete signals, for transferring a number of second signals, and said first signals, respectively, to said first storing means and said second storing means.

7. A servo system according to claim 6 wherein said stored samples corresponding to sectors $S_N + \Delta$ sent to said first subtractor and said phase compensation provided by said phase compensating means are dependent on said determined frequency of said repeatable error.

8. A servo system according to claim 7 wherein said means for sending comprises:
   (a) a memory for storing, respectively, said samples corresponding to sectors $S_N$; and
   (b) means, responsive to each of said sector pulses, for outputting said stored samples.

9. A servo system for positioning one member in relation to another movable member having a repeatable error at a predetermined frequency and being subject to offsets at a frequency lower than said predetermined frequency, comprising:
   (a) first means for generating first error signals representing fine positions between said one member and said other member at predetermined locations of said other member;
   (b) second means for generating second signals representing coarse positions of said one member in relation to said other member, said second signals including information of said repeatable error and said offsets;
   (c) means for storing those of said second signals which correspond to said predetermined locations;
   (d) third means for generating second error signals each representing the difference between said first error signals corresponding to one of said predetermined locations and said stored second signals corresponding to a second of said predetermined locations;
   (e) means for phase lagging said second error signals by a predetermined amount;
   (f) fourth means for generating third error signals representing the difference between said second signals from said second generating means corresponding to a third location of said other member and said phase lagged second error signals; and
   (g) means, responsive to said third error signals, for moving said one member in relation to said other member.

10. A servo system according to claim 9 wherein said phase lag is dependent on said predetermined frequency.

11. A servo system for positioning a recording head in relation to a data track on a rotatable disk having a repeatable error at a determined frequency and being subject to an offset at a frequency lower than said determined frequency, comprising:
   (a) means, connected to said head, for moving said head across said disk;
   (b) first means, coupled to said moving means, for generating first coarse positioning signals representing the positions of said moving means;
   (c) second means for generating second signals relating to said offset;
   (d) means for storing a predetermined number N of said first signals, said N first signals corresponding, respectively, to N sectors $S_N$ on said disk;
   (e) third means for generating first error signals representing the difference between said N first signals corresponding to sectors $S_N + \Delta$ and said second signals, where $S_N + \Delta$ corresponds to sectors spaced a predetermined number of degrees on said disk from sectors $S_N$;
   (e) means for phase compensating said first error signals a predetermined degree to produce phase compensated first error signals;
   (f) fourth means for generating second error signals corresponding to the difference between said first coarse positioning signals from said first generating means and said phase compensated first error signals and a signal representing said track; and
   (g) means, responsive to said second error signals, for controlling the movement of said moving means, whereby said head is coarsely positioned in relation to said track.

12. A servo system according to claim 11 wherein said compensating means provides a phase lag related to a difference in phase between said phase compensated first error signals and said first coarse positioning signals received by said fourth generating means.

13. A servo system according to claim 12 further comprising fifth means for generating third error signals corresponding to the fine position of said head in relation to said track at sectors $S_N$, said third error signals having information relating to said offset, said third generating means receiving said third error signals for sectors $S_N$ through said second generating means and receiving said N first signals corresponding to sectors $S_N + \Delta$ to generate fourth error signals, said phase compensating means phase compensating said fourth error signals by said predetermined degree, said fourth generating means generating fifth error signals corresponding to the difference between said first coarse positioning signals from said first generating means and said phase compensated fourth error signals and said signal representing said track, and said controlling means being responsive to said fifth error signals to control the movement of said moving means, whereby said head is finely positioned in relation to said track.

14. A servo positioner according to claim 13 wherein the sectors $S_N + \Delta$ are spaced 120° from the sectors $S_N$.

15. A servo positioner according to claim 14 wherein the determined frequency is 40 Hz. and the total phase lag of a signal through said phase compensating means, said fourth generating means, said controlling means and said first generating means is 60°.

16. A servo positioner according to claim 13 wherein said means for storing comprises:
   (a) a memory;
   (b) a first switching means for switching, when closed, said first coarse position signals into said memory; and
   (c) first means for closing said first switching means during fine positioning of said head at times corresponding to said sectors $S_N$.

17. A servo positioner according to claim 16 wherein said fifth generating means comprises:
   (a) a second switching means for switching, when closed, said third error signals to said second generating means; and
   (b) second means for closing said second switching means during fine positioning of said head at times corresponding to said sectors $S_N$.

18. A servo system according to claim 17 wherein said third generating means comprises a first subtractor for subtracting negative first signals corresponding to sectors $S_N + \Delta$ from positive signals from said second generating means, whereby positive first error signals are generated.

19. A servo system according to claim 17 wherein said fourth generating means comprises a second subtractor for subtracting negative first position signals from positive phase compensated first error signals and positive signals representing said track.

* * * * *